(12) United States Patent
Kamgar et al.

(10) Patent No.: US 12,488,311 B2
(45) Date of Patent: Dec. 2, 2025

(54) SYSTEMS AND METHODS FOR OPTIMIZING ORDER FULFILLMENT

(71) Applicant: inVia Robotics, Inc., Westlake Village, CA (US)

(72) Inventors: Kaveh Kamgar, West Hills, CA (US); Lior Elazary, Agoura Hills, CA (US); Randolph Charles Voorhies, Newbury Park, CA (US); William Shane Simpson Grant, Van Nuys, CA (US); Sagar Pandya, Thousand Oaks, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 370 days.

(21) Appl. No.: 18/189,758

(22) Filed: Mar. 24, 2023

(65) Prior Publication Data
US 2023/0325768 A1   Oct. 12, 2023

Related U.S. Application Data

(60) Provisional application No. 63/323,871, filed on Mar. 25, 2022.

(51) Int. Cl.
*G06Q 10/00* (2023.01)
*G06Q 10/087* (2023.01)

(52) U.S. Cl.
CPC ................ *G06Q 10/087* (2013.01)

(58) Field of Classification Search
CPC ...................................... G06Q 10/087
See application file for complete search history.

(56) References Cited

U.S. PATENT DOCUMENTS

| | | | |
|---|---|---|---|
| 8,121,876 B1* | 2/2012 | Braumoeller | G06Q 10/08 705/7.11 |
| 2016/0042315 A1* | 2/2016 | Field-Darragh | H04B 5/77 705/28 |

* cited by examiner

*Primary Examiner* — Rokib Masud
(74) *Attorney, Agent, or Firm* — Ansari Katiraei LLP; Arman Katiraei; Sadiq Ansari

(57) ABSTRACT

Disclosed is a system and associated methods for optimizing order fulfillment. The system determines the containers in a site with items for a set of received orders, and reserves different slot types of an item cache for each container based on the properties of the contained items or container. The system transfers a set of containers to the item cache by placing each of the set of containers into a slot that is associated with a slot type that matches a slot type reserved for that container. The system replaces a first container from the set of containers upon delivering a second container to the item cache and other containers from the set of containers in the slot type reserved for the second container having items for unfulfilled orders and the first container not having items for unfulfilled orders once the second container is brought to the item cache.

18 Claims, 7 Drawing Sheets

SYSTEMS AND METHODS FOR OPTIMIZING ORDER FULFILLMENT

CLAIM OF BENEFIT TO RELATED APPLICATIONS

This application claims the benefit of U.S. provisional patent application 63/323,871 entitled "Systems and Methods for Optimizing Order Fulfillment", filed Mar. 25, 2022. The contents of application 63/323,871 are hereby incorporated by reference.

BACKGROUND

An order fulfillment system coordinates and controls the manner by which customer orders are fulfilled. The order fulfillment system directs and/or controls the sequence with which items stored in different containers within a site are retrieved, picked, and/or otherwise used to complete different orders. Specifically, the order fulfillment system directs and/or controls the robots within the site that perform one or more of the object retrieval, item picking, and/or other tasks without human intervention.

The level of control exerted by the order fulfillment system may directly correlate to the overall efficiency and/or productivity of the site as well as the overall efficiency and/or productivity of the various agents operating within the site under the direction or control of the order fulfillment system. The order fulfillment system decreases the efficiency and/or productivity of the site by providing a suboptimal assignment of tasks and exerting suboptimal control over the agents. For example, the order fulfillment system may direct retrieval of a first object to a picking site, picking of items from the first object to fulfill a first order, returning the first object to a storage location, and subsequent re-retrieval of the first object to the picking site where it is used to fulfill a different third order. This is an example of a suboptimal assignment of tasks and performing a suboptimal control of the agents as the same object is retrieved multiple times in order to fulfill different orders when it could have been retrieved once and used to fulfill multiple orders, thereby freeing the agent to perform other tasks besides returning and re-retrieving the first object.

DETAILED DESCRIPTION OF PREFERRED EMBODIMENTS

Disclosed are systems and methods for optimizing order fulfillment in a site by coordinating and/or controlling the operation of robots that work independent of or in combination with humans and/or other agents to pick items for different orders from available inventory and to coalesce the items for each particular order at a location where that particular order is fulfilled. To optimize the order fulfillment, the systems and methods implement an item cache or picker wall, control a first set of agents (e.g., a first set of robots) in transferring containers that contain items for a subset of orders pending fulfillment to the picker wall, and control a second set of agents in coalescing the items for individual orders from the picker wall. The picker wall may include a rack, table, or other apparatus that holds two or more containers at any given time. The picker wall acts as a cache with a limited capacity in terms of the number of orders that can be fulfilled at any given time. Accordingly, the systems and methods include optimizing the placement and removal of containers from the picker wall. The optimizations minimize the total number of times that the containers are placed and removed from the picker wall in order to fulfill a set of orders.

In some embodiments, a controller optimizes the usage of the picker wall by reserving and/or locking locations about the picker wall for different containers, and delaying the decision to select and eject a container from the picker wall when all locations of the picker wall are occupied with a container and a new container is transferred to the picker wall. The controller generates an order fulfillment plan based on a set of orders pending fulfillment, sizes of the containers with the items for the set of orders, types of items stored in each container, size of the picker wall, slot types of the picker wall for accommodating different containers and/or item types, and/or other criteria. The controller optimizes the order fulfillment plan based on the criteria in order to maximize order fulfillment throughout and/or the number of orders that may be fulfilled with the fewest number of container retrievals to and ejections from the picker wall. By incorporating the slot reservations as part of the order fulfillment plan and/or the transfer of containers to and from the picker wall, the controller is able to delay container removal decisions, and in doing so, may determine the set of containers that may occupy the picker simultaneously and that result in the greatest number of orders being fulfilled in the least amount of time.

Figure 1:
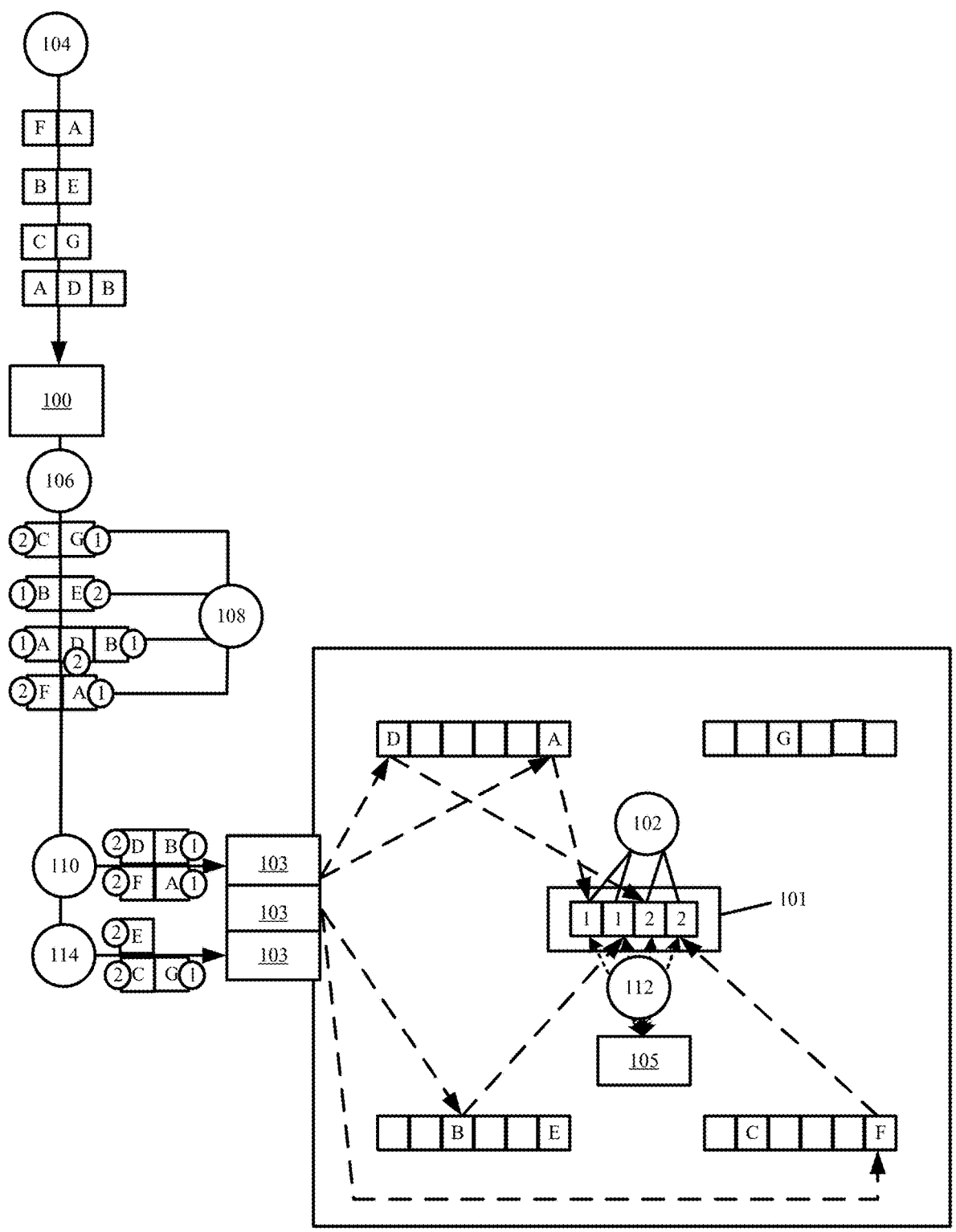
FIG. 1 illustrates an example of optimizing the usage of a picker wall in accordance with some embodiments presented herein.

FIG. 1 illustrates an example of controller 100 optimizing the usage of picker wall 101 in accordance with some embodiments presented herein. Controller 100 tracks and/or monitors different available slots of picker wall 101 into which different containers or items may be placed. As part of tracking the available slots of picker wall 101, controller 100 assigns (at 102) a slot type to each slot based on the types of items or containers that may be placed into that slot. For instance, picker wall 101 may be partitioned with a first set of slots that may be used to store large, heavy, food-grade, non-hazardous, and/or fragile, and with a second set of slots that may be used to store small, light, non-food-grade, hazardous, and/or non-fragile containers. In some embodiments, the slots of picker wall 101 are differentiated based on other designations or classifications of items in the containers or for the containers themselves. In some embodiments, the slots of picker wall 101 may be interchangeably used for two or more container types. For instance, the slots of picker wall 101 may be defined to be the size of a small container. In other words, a single small container may occupy a single slot. The slots may also accommodate large containers that occupy three slots when inserted into picker wall 101. In some embodiments, controller 100 tracks the availability and usage of the slots about picker wall 101 by tracking the types of containers that have been retrieved to and placed on picker wall 101 and the locations of those containers about picker wall 101 based on wireless messaging received from one or more agents that retrieve and place the containers.

Controller 100 receives (at 104) a set of orders pending fulfillment. The set of orders may be in a first sequence that corresponds to the sequence in which the orders were placed or received. Each order is for one or more items stored in containers distributed across a warehouse or site configured with picker wall 101. Fulfillment of each order requires retrieval of at least one container that contains the one or more items of the order to picker wall 101 where agents pick and coalesce the ordered items of the order, and prepare the order for shipping, packing, or final fulfillment stages.

Controller 100 generates (at 106) a second sequence with which to fulfill the set of orders. Controller 100 generates (at 106) the second sequence by rearranging the set of orders for optimal fulfillment based on a set of optimization criteria. In some embodiments, the second sequence differentiates and prioritizes fulfillment of high-priority orders over low-priority orders. High-priority orders may include orders that have a next-day or immediate fulfillment date, and low-priority orders may include orders that may be fulfilled two or more days in the future. Controller 100 uses the set of optimization criteria to determine the second sequence that fulfills the high-priority orders within the set of orders in the least amount of time with the fewest container retrievals and removals from picker wall 101. In other words, the second sequence maximizes order fulfillment throughput by minimizing or eliminating unused or unoccupied slots during order fulfillment and by arranging the containers that are placed onto picker wall 101 in a manner that allows orders with common items to be fulfilled at the same time with the least total movement between the containers about picker wall 101.

Controller 100 may generate a dependency graph that defines the second sequence with which to transfer containers for the set of orders to picker wall 101. Based on the dependency graph, controller 100 may select a first subset of containers that contain items for a first subset of high-priority orders from the set of orders and that occupy all slots and slot types of picker wall 101.

Controller 100 reserves (at 108) a slot type and/or specific slot from picker wall 101 into which each container of the first subset of containers may be placed. In generating (at 106) the second sequence and reserving (at 108) the slot types, controller 100 analyzes the size of each container and which slot types the containers may occupy, and generates different permutations or combinations of containers containing items for the set of items that fill all or the greatest number of slots of picker wall 101 and allow for the greatest number of orders to be fulfilled at one time based on the containers that are retrieved to picker wall 101.

Controller 100 controls (at 110) first set of agents 103 in transferring the first subset of containers to the reserved slot types of picker wall 101 so that each slot of picker wall 101 becomes occupied. Controller 100 controls (at 112) second set of agents 105 in picking items that fulfill a first subset of the set of orders in the second sequence.

Controller 100 assigns (at 114) a second subset of containers for first set of agents 103 to retrieve from inventory and to transfer to picker wall 101. The second subset of containers may contain the items needed to fulfill a second subset of the set of orders in the second sequence. However, rather than select a specific slot of picker wall 101 for each container of the second subset of containers, controller 100 reserves (at 108) a slot type from picker wall 101 into which each container of the second subset of containers may be placed.

Once a container from the second subset of containers is delivered to picker wall 101, controller 100 may determine which previously placed container of the first subset of containers on picker wall 101 to eject to make room for the newly delivered container. In some embodiments, controller 100 may determine a particular slot type reserved for the newly delivered container, and may identify two or more previously delivered containers residing in slots of the particular slot type. Controller 100 may perform a replanning operation to determine whether the reservations for any of the previously delivered containers have been released. For instance, second set of agents 105 may have picked items from a particular container that are needed for the first subset of orders, and controller 100 may determine that the items of the particular container are not needed for any other orders of the set of orders or are not needed for the second subset of orders. Accordingly, controller 100 controls one or more agents 103 in removing the particular container from picker wall 101, and in placing the newly delivered container for the second subset of orders into the slot that was previously occupied by the particular container.

Controller 100 uses the slot reservations to prioritize the placement of different containers onto picker wall 101 without selecting a specific slot and/or another container to eject from picker wall 101 at the time the containers are assigned to first set of agents 103 for retrieval from inventory. Instead, controller 100 delays the slot selection and container ejection decision until the containers are delivered to picker wall 101 so that the current or most recent state of the order fulfillment may be accounted for before ejecting any containers from picker wall 101. For instance, a first container in a first slot of a particular slot type may include items for a next set of orders pending fulfillment, and a second container in a second slot of the particular slot type may include items for a last set of orders pending fulfillment. Controller 100 may eject the second container instead of the first container to allow the next set of orders to be fulfilled without delay and/or waiting for the first container to be relocated on picker wall 101. In this manner, the slot type reservations may optimize order fulfillment by accounting for the current state of orders before deciding which container to remove and/or replace from picker wall 101.

Figure 2:
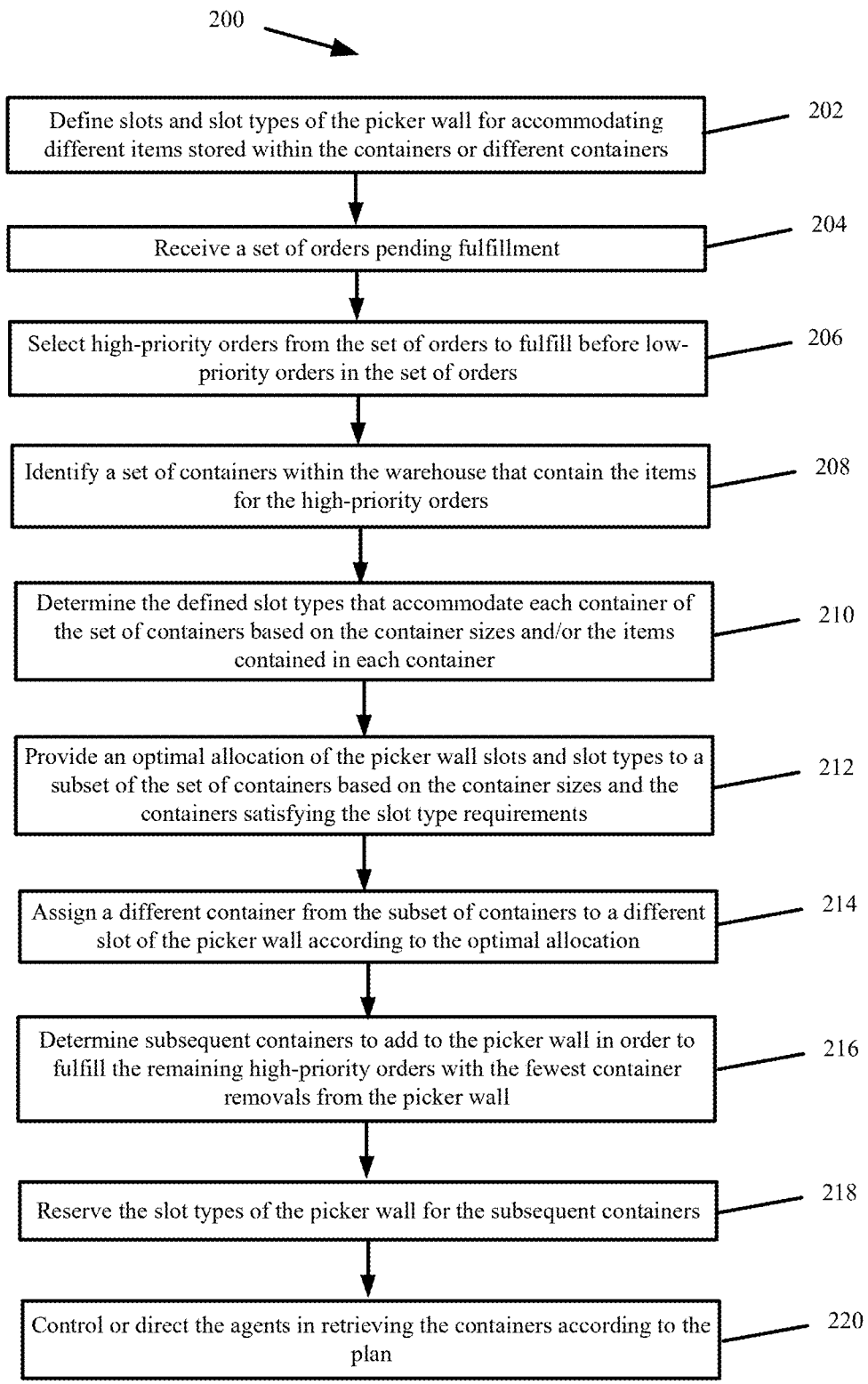
FIG. 2 presents a process for performing slot reservations about a picker wall cache to optimize order fulfillment in accordance with some embodiments presented herein.

FIG. 2 presents a process 200 for performing slot reservations about a picker wall cache to optimize order fulfillment in accordance with some embodiments presented herein. Process 200 is implemented by controller 100. Controller 100 includes one or more devices or machines that interface with an order fulfillment system of a vendor, merchant, warehouse, logistics provider, and/or other site where orders are fulfilled, and that further interfaces, directs, and/or controls robots and/or other agents within the site that perform the order fulfillment. Controller 100 uses network messaging to interface with the other devices or agents, and includes processing, memory, storage, network, and/or other hardware resources to coordinate and control the optimized order fulfillment within the site.

Process 200 includes defining (at 202) slots and slot types of the picker wall for accommodating different items stored within the containers or different containers. In some embodiments, the partitioning (at 202) may include a physical partitioning in which the picker wall is separated into slots that accommodate containers of different sizes, weights, or other configurations or classifications (e.g., refrigerated versus non-refrigerated slots). In some other embodiments, the partitioning (at 202) may include a virtual partitioning of the picker wall. For instance, the picker wall may include uniform shelves or racks about which any container may be stored. The virtual partitioning designates different locations about the picker wall for temporary storage or placement of specific types of containers. For instance, the partitioning may include defining each slot as one foot of horizontal space about the picker wall for a small-sized container and three such slots for a large-sized container.

Process 200 includes receiving (at 204) a set of orders pending fulfillment. The set of orders may arrive overnight, throughout the day, or over a given interval where they are buffered prior to fulfillment. Each order is for one or more items that are housed or stored in one or more containers distributed across storage racks of the site. Controller 100 stores a mapping of each ordered item to the container that contains one or more units of that item in the warehouse, and tracks the location of each container in the site. For instance, whenever a robot places a container into a particular storage location, the robot scans a first fiducial or other identifier of the container that identifies the container being placed, and a second fiducial or other identifier at the particular storage location that identifies or maps to a specific position in the site. The first and second fiducials are wirelessly transmitted from the robot to controller 100, and controller 100 updates its dynamic map of container storage locations based on the received messaging from the robots. In some embodiments, the placement of containers into storage may be performed by human agents. In some such embodiments, the human agents use scanners to scan the first and second fiducials, and the scanners transmit the data to controller 100.

Process 200 includes selecting (at 206) high-priority orders from the set of orders to fulfill before low-priority orders in the set of orders. In some embodiments, the high-priority orders are differentiated from the low-priority orders based on delivery dates or fulfillment dates. For instance, the high-priority orders may be associated with next-day or two-day shipment dates. In some other embodiments, the high-priority orders are differentiated from the low-priority orders based on the customer placing the order, the order amounts, and/or the items of each order. For instance, the high-priority orders may include perishable food items, whereas the low-priority orders may include consumer goods with distant expiration or use-by dates.

Process 200 includes identifying (at 208) a set of containers within the warehouse that contain the items for the high-priority orders. Specifically, controller 100 identifies the items ordered as part of the high-priority orders, and determines the containers and the storage location of the containers that house those items in the warehouse or inventory storage racks.

Process 200 includes determining (at 210) the defined slot types that accommodate each container of the set of containers based on the container sizes and/or the items contained in each container. Controller 100 tracks or is configured with the container sizes, and determines (at 210) which slot types accommodate which containers based on the container sizes. For instance, a large-sized container may not be placed in a slot type that is reserved for small-sized container, or a large-sized container may require a certain number of consecutive small-sized slots in order to be placed on the picker wall. The container sizes may also account for container weight, whereby heavy container may be limited to placement in slot types for heavy containers and cannot be placed in slot types for light containers. Controller 100 also tracks the items that are stored within each container to determine if the stored items are food-grade, perishable, fragile, heavy, hazardous, and/or have other properties that limit which slots of the picker wall the container may be placed in.

Process 200 includes providing (at 212) an optimal allocation of the picker wall slots and slot types to a subset of the set of containers based on the container sizes and the containers satisfying the slot type requirements. In some embodiments, providing (at 212) the optimal allocation includes performing a tightest fit allocation of the picker wall slots that allocates each slot of each slot type to a container and ensuring that no picker wall slots are empty or unused because of a suboptimal allocation. Performing the tightest fit allocation includes selecting different combinations of the set of containers, and determining the number of slots that are occupied by each allocation. Controller 100 then compares the combinations that fill all the slots, and selects the particular subset of containers that fulfill the greatest number of the high-priority orders in the least amount of time. The time elements is computed based on the distance that one or more agents have to travel about the picker wall and between the containers in order to fulfill the orders. When containers with items for the same order are placed next to one another on the picker wall, less time is required to pick the items from those containers.

Process 200 includes assigning (at 214) a different container from the subset of containers to a different slot of the picker wall according to the optimal allocation. In other words, the subset of containers are not randomly assigned to the picker wall slots. Rather, the subset of containers are assigned to slots that accommodate the container size, and the items in the container and the container itself are suitable for the designated slot type. Moreover, the subset of containers are assigned to the slots with a specific ordering or positioning about the picker wall that minimizes the total distance that an agent has to travel in order to pick the items for the high-priority orders associated with the subset of containers.

Process 200 continues the planning by determining (at 216) subsequent containers to add to the picker wall in order to fulfill the remaining high-priority orders with the fewest container removals from the picker wall. For instance, controller 100 determines that a first container from the first subset of containers contains items for a first subset of high-priority orders that are to be fulfilled by the initial retrieval of containers to the picker wall and also contains items for a second subset of high-priority orders that are to be fulfilled once the first subset of high-priority orders are fulfilled. Controller 100 also determines that a second container from the first subset of containers contains items for a first subset of high-priority orders that are to be fulfilled by the initial retrieval of containers to the picker wall but does not contain items for the second subset of high-priority orders that are to be fulfilled after the first subset of high-priority orders. Accordingly, controller 100 may designate the second container for removal before the first container.

Process 200 includes reserving (at 218) the slot types of the picker wall for the subsequent containers. Specifically, controller 100 does not designate an exact location or slot of the picker wall where the subsequent containers are to be placed. Instead, controller 100 determines which of the slots accommodate the container size and the items contained by the container, and leaves the slot selection open until each of the subsequent containers is retrieved and delivered to the picker wall by one of the retrieval agents after the subset of containers are first placed on the picker wall and used to fulfill the first subset of high-priority orders.

Process 200 includes controlling (at 220) or directing the agents in retrieving the containers according to the plan. For instance, controller 100 activates a set of robots in transferring the subset of containers for the first subset of high-priority orders to the picker wall according to the optimal allocation, directs a set of picking agents in picking the items for the first subset of high-priority orders from the subset of containers on the picker wall, and controls the set of robots in delivering the subsequent containers for the second subset of high-priority orders to the picker wall at which time a decision is made by controller 100 as to which container from the first subset of containers is no longer needed and may be removed in order to replace the containers of the picker wall.

Figure 3:
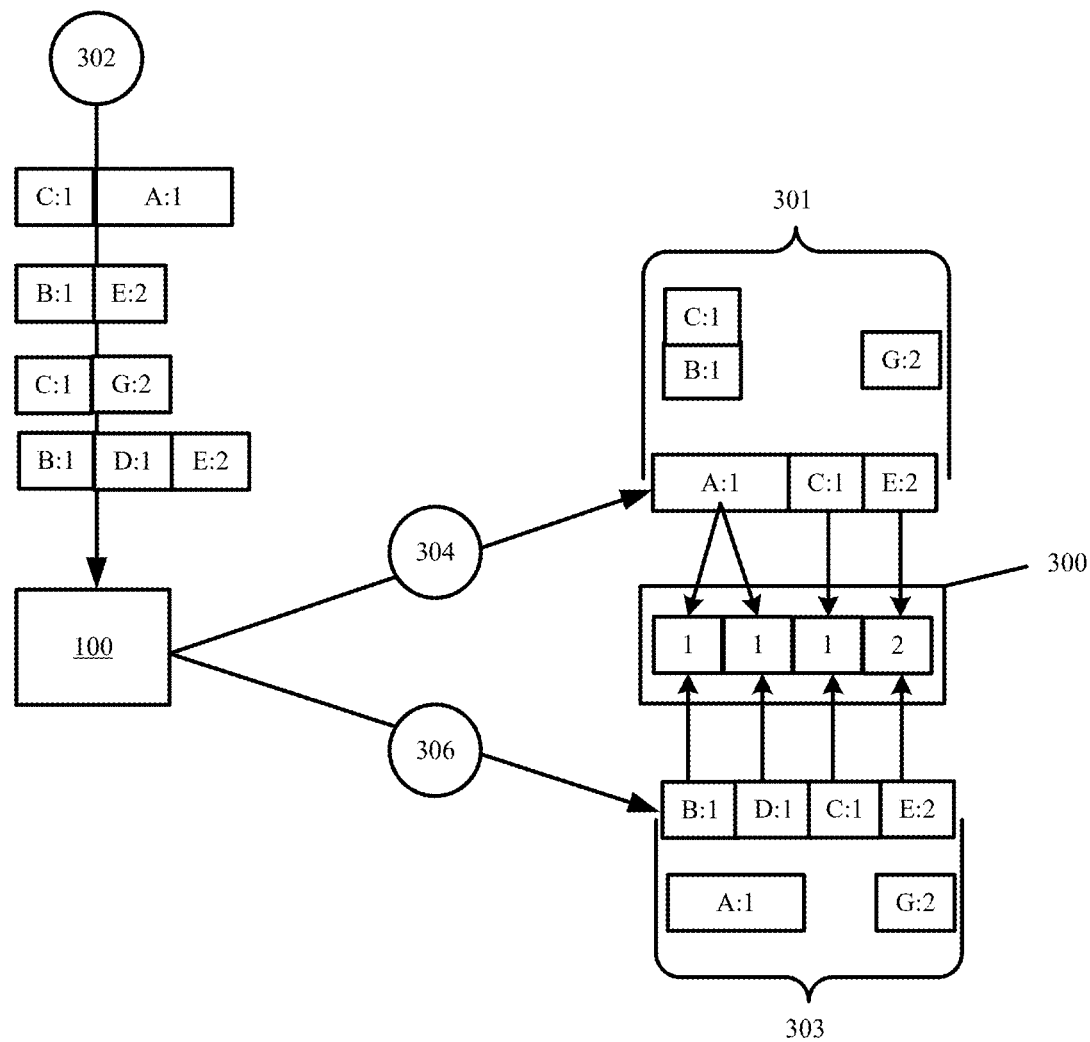
FIG. 3 illustrates an example of different container allocations that provide suboptimal and optimal order fulfillment in accordance with some embodiments presented herein.

FIG. 3 illustrates an example of different container allocations that provide suboptimal and optimal order fulfillment in accordance with some embodiments presented herein. Picker wall 300 is illustrated with 3 slots of a first type and 1 slot of a second type. Controller 100 receives (at 302) a set of 4 orders pending fulfillment. The set of 4 orders are for items in 4 containers that fit in the first slot type (e.g., A1, B1, C1, and D1) and for items in 2 containers that fit in the second slot type (e.g., E2 and G2). The containers may be of different sizes such that one container (e.g., A1) occupies 2 slots of the first slot type and other containers (e.g., B1, C1, and D1) occupy 1 slot of the first slot type.

Controller 100 generates (at 304) first allocation 301 for fulfilling the received orders. First allocation 301 illustrates a sub-optimal usage of picker wall 300 or sub-optimal order fulfillment plan. First allocation 301 includes occupying the first type slots with 2 containers (e.g., A1 and C1) and the second type slot with 1 container (e.g., E2), and reserving the correct slot types for the remaining containers needed to fulfill the other received orders. The containers selected for first allocation 301 lead to only 1 order (e.g., A1+C1) from the set of orders being fulfilled. Moreover, to fulfill the other orders, two additional swaps of the picker wall containers is required. For instance, once the items from the A1 and C1 containers have been picked and used to fulfill order A1+C1, the A1 container may be replaced with containers B1 and C1. Picker wall 300 will then store containers B1, C1, and E2 which may be used to fulfill two other orders (e.g., B1+E2 and B1+D1+E2). Then, container E2 is swapped out for container G2 before the final order for C1+G2 is fulfilled.

Controller 100 generates (at 306) second allocation 303. Second allocation 303 is an example of an optimal usage of picker wall 300 or optimal order fulfillment plane. Second allocation 303 includes occupying the first type slots with 3 containers (e.g., B1, D1, and C1) and the second type slot with 1 container (e.g., E2), and reserving the correct slot types for the remaining containers needed to fulfill the other received orders. The containers selected for second allocation 303 lead to 2 orders (e.g., B1+E2 and B1+D1+E2) from the set of orders being fulfilled and a single swap of the picker wall container results in all 4 orders being fulfilled. For instance, once the items from the B1, D1, C1, and E2 containers have been picked and used to fulfilled orders B1+E2 and B1+D1+E2, the B1, D1, and E2 containers may be replaced with the A1 and G2 containers at which point the final 2 orders for A1+C1 and C1 and G2 may be fulfilled.

Also disclosed are systems and methods for optimizing order fulfillment based on partitioned sortation of ordered items. In some embodiments, controller 100 may partition the picker wall into multiple zones, and may allocate each zone for the fulfillment of a different subset of orders.

The partitioning may include a logical partitioning in which different regions about the same picker wall are designated as different zones. The partitioning may also include a physical partitioning in which different racks or picker walls are placed at different locations within a site, and each picker wall is designated as a different zone.

Controller 100 may control a first set of agents in transferring a first set of containers with items for a first subset of orders to a first zone of the picker wall, and a second set of containers with items for a second subset of orders to a second zone or area of the picker wall. One or more of a second set of agents may be assigned to each zone such that one of the second set of agents operates exclusively in the first zone in order to pick the items for the first subset of orders from the first set of containers in the first zone, and another one of the second set of agents operates exclusively in the second zone in order to pick the items for the second subset of orders from the second set of containers in the second zone.

Once a particular container in the first zone is no longer needed for the fulfillment of the first subset of orders, controller 100 may determine if the particular container contains items needed to fulfill orders in other zones. If the particular container contains items for an order awaiting fulfillment in another zone, controller 100 may instruct one or more of the first set agents to transfer the particular container from the first zone of the picker wall to the other zone so other orders assigned to the other zone may be fulfilled. Otherwise, controller 100 may instruct one or more of the first set of agents to return the particular container into inventory or storage.

Controller 100 may continually shift the containers between the picker wall zones and long-term storage to optimize the fulfillment of orders. In some embodiments, controller 100 may plan an optimal sequence with which to fulfill and/or assign the orders to different zones, wherein the optimal sequence minimizes conflict between a container being needed to fulfill orders in different zones at the same time while maximizing the batching of containers needed in any given zone to fulfill the orders that are assigned to that zone.

Figure 4:
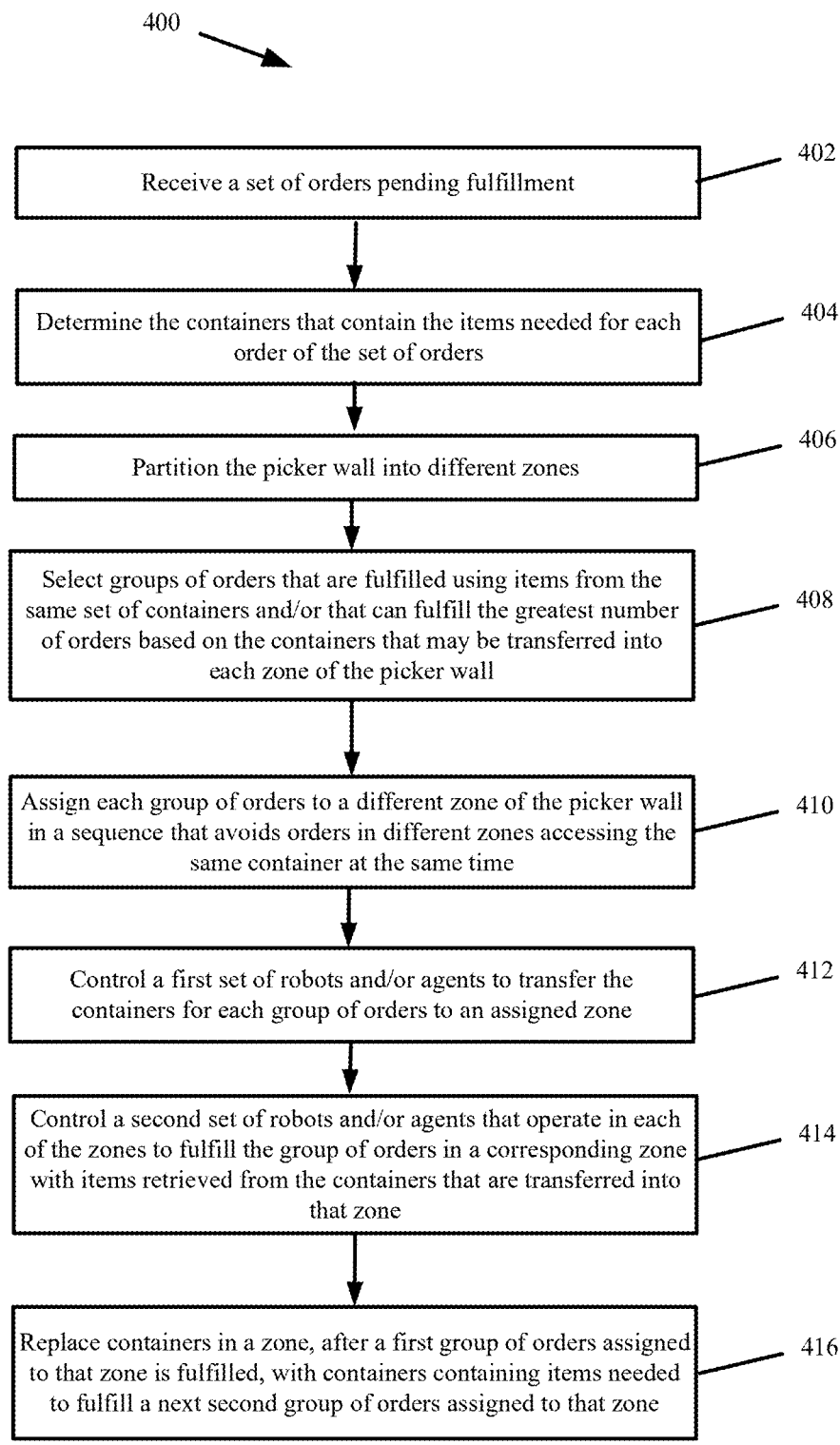
FIG. 4 illustrates a process for planning an optimal sequence to fulfill orders using a picker wall that is partitioned into multiple zones in accordance with some embodiments presented herein.

FIG. 4 illustrates a process 400 for planning an optimal sequence to fulfill orders using a picker wall that is partitioned into multiple zones in accordance with some embodiments presented herein. Process 400 is implemented by controller 100.

Process 400 includes receiving (at 402) a set of orders pending fulfillment, determining (at 404) the containers that contain the items needed for each order of the set of orders, and partitioning (at 406) one or more picker walls into different zones. Each zone may include two or more different slots of the picker wall or a different picker wall with two or more slots.

Process 400 includes selecting (at 408) groups of orders that are fulfilled using items from the same set of containers and/or that can fulfill the greatest number of orders based on the containers that may be transferred into each zone of the picker wall. Process 400 includes assigning (at 410) each group of orders to a different zone of the picker wall in a sequence that avoids orders in different zones accessing the same container at the same time.

Process 400 includes controlling (at 412) a first set of robots and/or agents to transfer the containers for each group of orders to an assigned zone, and controlling (at 414) a second set of robots and/or agents that operate in each of the zones to fulfill the group of orders in a corresponding zone with items retrieved from the containers that are transferred into that zone. Process 400 further includes replacing (at 416) one or more containers in a zone, after a first group of orders assigned to that zone is fulfilled, with containers containing items needed to fulfill a next second group of orders assigned to that zone. Replacing (at 416) the one or more containers includes transferring the containers to other zones where they are needed to fulfill a next group of orders assigned to the other zones, or ejecting containers from a particular zone back into storage and transferring other containers that are needed to fulfill a next group of orders assigned to the particular zone in their place.

Figure 5:
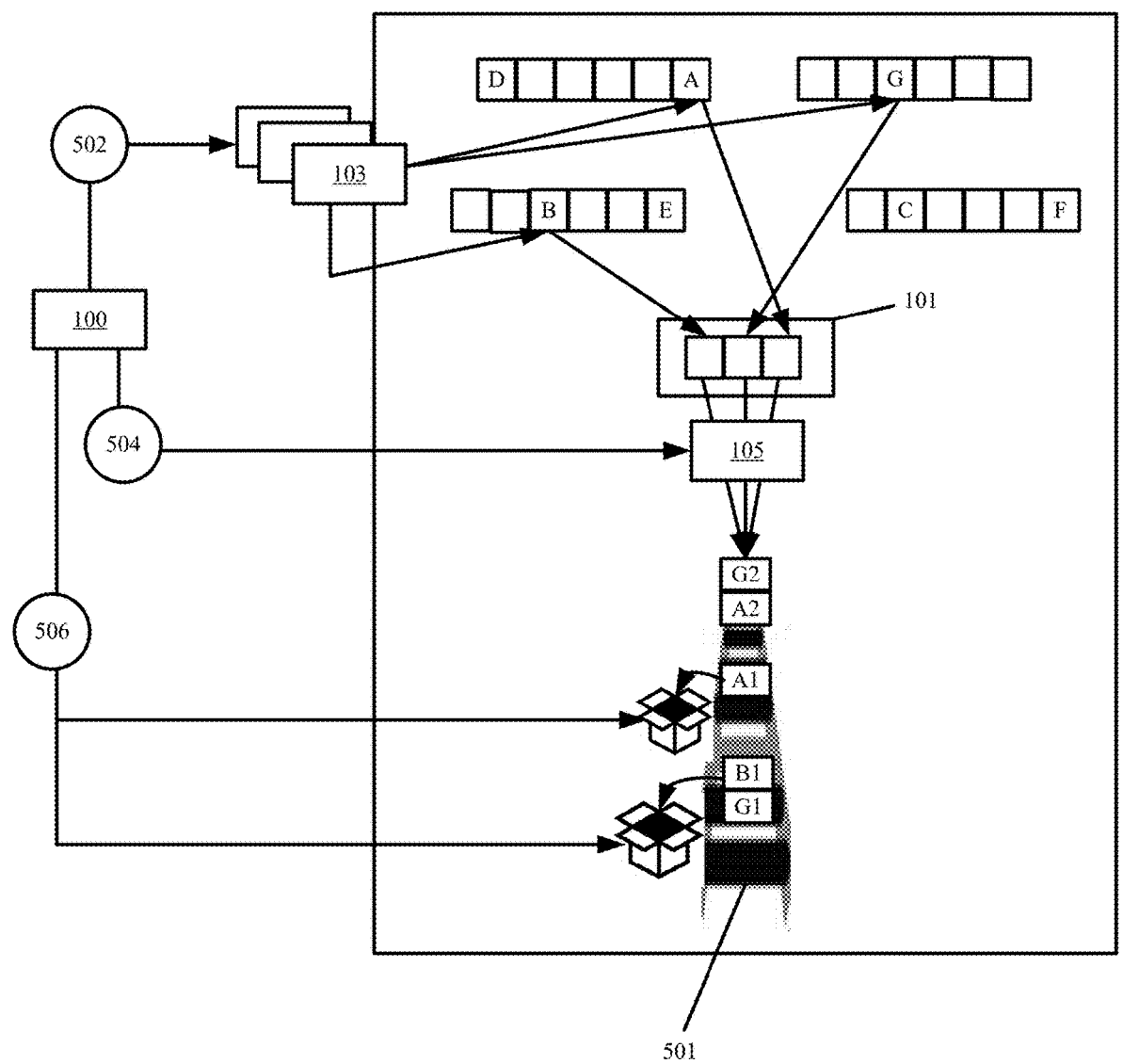
FIG. 5 illustrates an example of a pick and sort order fulfillment methodology in accordance with some embodiments presented herein.

In some embodiments, controller 100 may forego partitioning the picker wall into different zones. Instead, as shown in FIG. 5, controller 100 controls (at 502) first set of agents 103 in transferring containers for a set of orders to picker wall 101, and controls (at 504) second set of agents 105 in picking items for the set of orders from the containers transferred to picker wall 101. In some embodiments, second set of agents 105 may place the picked items into one or more carts, and may transfer the items from the one or more carts onto conveyor 501. In some embodiments, second set of agents 105 may transfer the items for the set of orders directly from picker wall 101 onto conveyor 501.

Controller 100 controls (at 506) sortation equipment, robots, or other agents located along conveyor 501 in picking items for different orders off conveyor 501 in order to fulfill those orders. In some embodiments, imaging devices along conveyor 501 may scan the items passing over conveyor 501, and controller 100 may activate a ram, piston, tilt tray, or other mechanism to push items of a particular order off conveyor 501 at a designated location. Different orders may be assigned different locations across the conveyor. In some other embodiments, the imaging devices may instruct personnel distributed along conveyor 501 about items that belong to one or more orders being fulfilled at a corresponding location and that should be removed from conveyor 501 by the personnel at those locations. In any case, picker wall 101 may be used to localize the containers that contain items for a set of orders, and may be used to feed those items to a sortation system that then separates the individual items for individual orders via control provided by controller 100.

In some embodiments, the sortation system may include a set of robots that move the carts containing the items for the set of orders between different stations. At each station, one or more agents may pick items for a subset of orders from a delivered cart. Once the items for the subset of orders are picked from a particular cart, a robot may move the particular cart to a next station.

Figure 6:
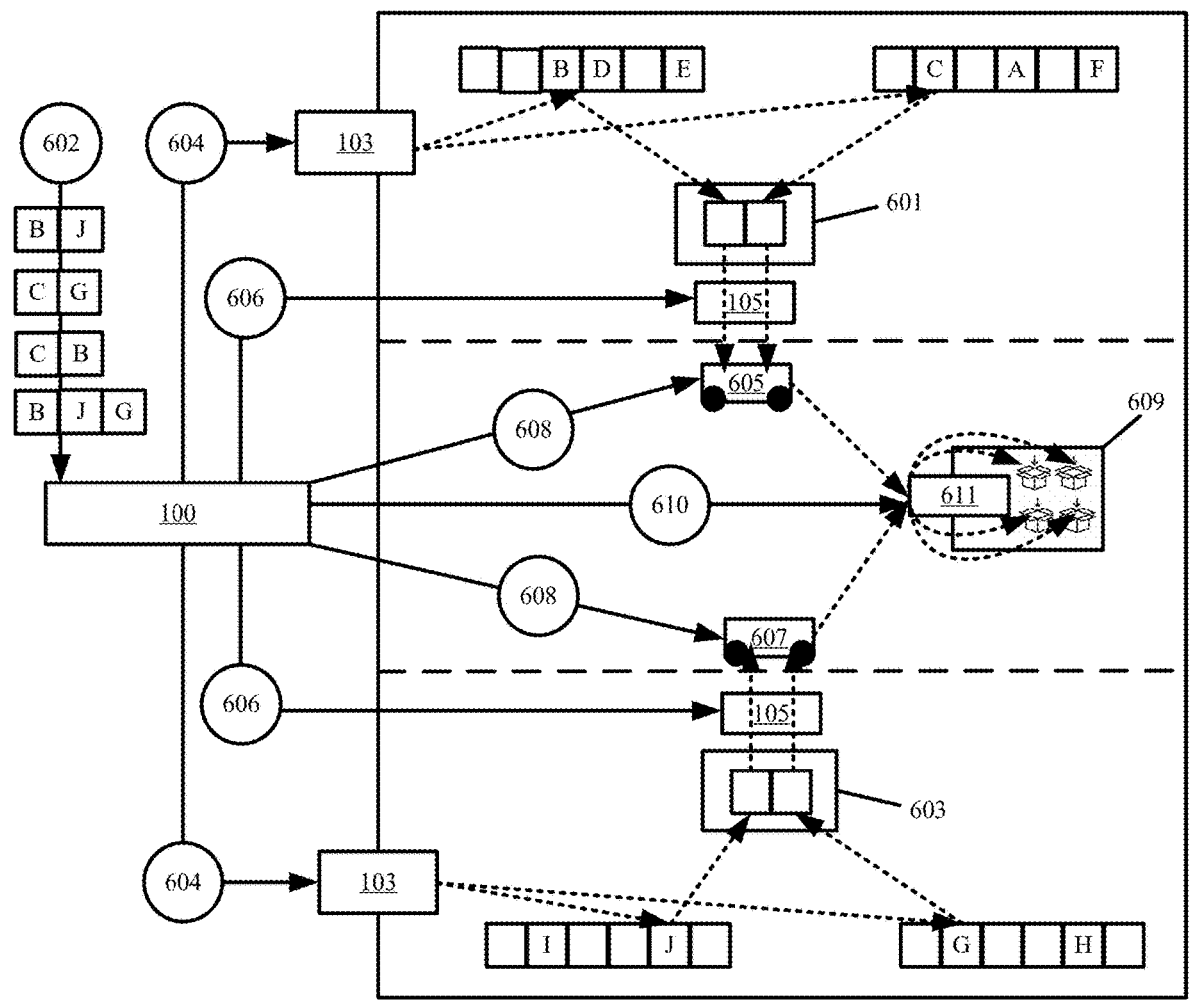
FIG. 6 illustrates a pick and consolidate order fulfillment methodology in accordance with some embodiments presented herein.

FIG. 6 illustrates a pick and consolidate order fulfillment methodology in accordance with some embodiments presented herein. As shown in FIG. 6, different picker wall zones 601 and 603 may be established within a site. Each zone may be located next to a different group of items in inventory.

Controller 100 receives (at 602) a set of orders for a set of items. Controller 100 controls (at 604) first set of agents 103 in transferring the containers that store different subsets of the set of items to whichever of picker wall zones 601 and 603 is closest to the storage location of each container. Consequently, first set of agents 103 may place a different subset of containers storing a different subset of the ordered items in each picker wall zone 601 and 603.

Controller 100 controls (at 606) second set of agents 105 that are located next to each picker wall zone 601 and 603 to pick and place the subset of items from the subset of containers at a corresponding picker wall zone 601 and 603 into a consolidation container 605 or 607 positioned next to that picker wall zone 601 or 603. Once the subset of items from the subset of containers at a picker wall zone 601 and 603 have been placed into consolidation container 605 or 607, controller 100 directs (at 608) the transfer of consolidation containers 605 and 607 to sortation station 609. In some embodiments, controller 100 directs (at 608) one of the second set of agents at each picker wall zone 601 and 603 to transfer consolidation container 605 or 607 to sortation station 609. In some embodiments, consolidation containers 605 and 607 may include remote controlled motorized carts and/or may be attached or connected to the robots, and controller 100 may directly control the movements of consolidation containers 605 and 607 to the sortation station 609. Once the consolidation containers 605 and 607 are at sortation station 609, controller 100 controls (at 610) third set of agents 611 in coalescing the items for each order of the set of orders from consolidation containers 605 and 607.

Figure 7:
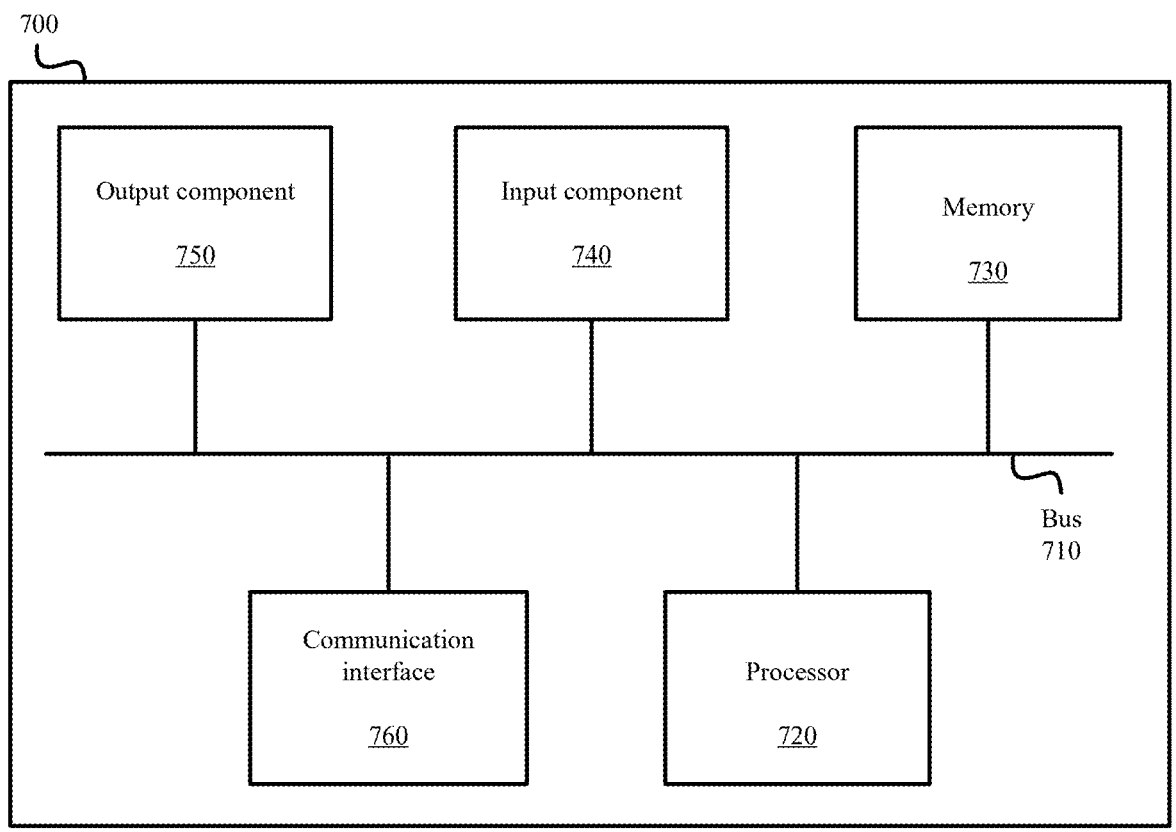
FIG. 7 illustrates example components of one or more devices, according to one or more embodiments described herein.

FIG. 7 is a diagram of example components of device 700. Device 700 may be used to implement one or more of the devices or systems described above (e.g., controller 100, the robots and/or agents under control of controller 100, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method for optimizing usage of an item cache by a plurality of autonomous robots, the method comprising:
receiving a set of orders for a plurality of items;
determining a plurality of containers distributed in a site that contain the plurality of items;
reserving one of a plurality of slot types available at the item cache for each container of the plurality of containers in a plan that is distributed to the plurality of autonomous robots for execution, wherein different sets of the plurality of slots are associated with a different slot type of the plurality of slot types;
controlling the plurality of autonomous robots according to the plan and different reservations of different slot types for different containers of the plurality of containers, wherein controlling the plurality of autonomous robots comprises transferring a set of containers from the plurality of containers to the plurality of slots via coordinated operation of the plurality of autonomous robots, wherein the set of containers contain items for a subset of orders from the set of orders, wherein said transferring comprises placing each container of the set of containers into a slot that is associated with a slot type that matches a slot type reserved for that container;
directing at least one autonomous robot from the plurality of autonomous robots in retrieving a particular container from the plurality of containers in the site, wherein a particular slot type is reserved for the particular container in the plan distributed to the plurality of autonomous robots for execution;
selecting to eject one of a first container and a second container from the set of containers that are placed in slots of the particular slot type at the item cache in response to detecting arrival of the at least one autonomous robot with the particular container at the item cache, wherein selecting to eject one of the first container and the second container is based on a next unfulfilled order from the set of orders that requires items from one of the first container or the second container; and controlling the plurality of autonomous robots in replacing the second container with the particular container in response to the first container comprising items of the next unfulfilled order.

2. The method of claim 1 further comprising:
partitioning the plurality of slots into different slot types.

3. The method of claim 1 further comprising:
differentiating high-priority orders and low-priority orders from the set of orders based on dates associated with each order of the set of orders; and
selecting the high-priority orders as the subset of orders.

4. The method of claim 1 further comprising:
determining an optimal allocation of the plurality of slots based on the slot type associated with each slot of the plurality of slots and the slot type reserved for each container of the plurality of containers, wherein determining the optimal allocation comprises:
   determining different combinations of the plurality of containers that occupy the plurality of slots of the item cache;
   determining a number of orders from the set of orders that are fulfilled based on items contained in each combination of the plurality of containers; and
   selecting the set of containers for the optimal allocation of the plurality of slots in response to the set of containers containing items for fulfilling a greater number of orders than items contained in other combinations of the plurality of containers.

5. The method of claim 1, wherein selecting to eject one of the first container and the second container comprises:
   detecting a second subset of orders from the set of orders that remain unfulfilled;
   determining a fewest number of container replacements from the plurality of slots for populating the plurality of slots with containers containing items for fulfilling the second subset of orders; and
   selecting the second container for removal from the plurality of slots while retaining the first container in response to the second container being part of the fewest number of container replacements.

6. The method of claim 1, wherein transferring the set of containers further comprises:
   detecting the particular slot type that was reserved for a container of the set of containers;
   identifying a location of a particular slot amongst the plurality of slots of the item cache that is associated with the particular slot type; and
   inserting the container into the particular slot.

7. The method of claim 1, wherein reserving one of the plurality of slot types comprises:
   selecting a set of the plurality of slots as candidates for temporary storage of the particular container at the item cache without designating a specific slot from the set of slots for the particular container.

8. The method of claim 7, wherein selecting to eject one of the first container and the second container comprises:
   selecting the specific slot for the particular container once the particular container is transferred to the item cache and based on a fulfillment state of the subset of orders.

9. The method of claim 1, wherein selecting to eject one of the first container and the second container comprises:
   delaying a selection of a slot for the particular container until the particular container is transferred to the item cache; and
   selecting the slot for the particular container based on items for the subset of orders that have been retrieved from the set of containers in the plurality of slots.

10. The method of claim 1, wherein the plurality of slot types comprises one or more slot types for:
   perishable and non-perishable goods,
   hazardous and non-hazardous goods,
   fragile and non-fragile goods,
   food-grade and non-food-grade goods, and
   large and small items.

11. The method of claim 1 further comprising:
   tracking occupancy of the plurality of slots based on wireless messaging received from the plurality of autonomous robots that indicates a placement of each container from the set of containers to one or more of the plurality of slots.

12. An autonomous order fulfillment system comprising:
   a plurality of autonomous robots;
   an item cache; and
   a controller for optimizing usage of the item cache by the plurality of autonomous robots, the controller comprising one or more processors configured to:
      receive a set of orders for a plurality of items;
      determine a plurality of containers distributed in a site that contain the plurality of items;
      reserve one of a plurality of slot types available at the item cache for each container of the plurality of containers in a plan that is distributed to the plurality of autonomous robots for execution, wherein different sets of the plurality of slots are associated with a different slot type of the plurality of slot types;
      control the plurality of autonomous robots according to the plan and different reservations of different slot types for different containers of the plurality of containers, wherein controlling the plurality of autonomous robots comprises transferring a set of containers from the plurality of containers to the plurality of slots via coordinated operation of the plurality of autonomous robots, wherein the set of containers contain items for a subset of orders from the set of orders, wherein said transferring comprises placing each container of the set of containers into a slot that is associated with a slot type that matches a slot type reserved for that container;
      direct at least one autonomous robot from the plurality of autonomous robots in retrieving a particular container from the plurality of containers in the site, wherein a particular slot type is reserved for the particular container in the plan distributed to the plurality of autonomous robots for execution;
      select to eject one of a first container and a second container from the set of containers that are placed in slots of the particular slot type at the item cache in response to detecting arrival of the at least one autonomous robot with the particular container at the item cache, wherein selecting to eject one of the first container and the second container is based on a next unfulfilled order from the set of orders that requires items from one of the first container or the second container; and
      control the plurality of autonomous robots in replacing the second container with the particular container in response to the first container comprising items of the next unfulfilled order.

13. The autonomous order fulfillment system of claim 12, wherein the one or more processors of the controller are further configured to:

differentiate high-priority orders and low-priority orders from the set of orders based on dates associated with each order of the set of orders; and select high-priority orders as the subset of orders.

14. The autonomous order fulfillment system of claim 12, wherein the one or more processors of the controller are further configured to:

determine an optimal allocation of the plurality of slots based on the slot type associated with each slot of the plurality of slots and the slot type reserved for each container of the plurality of containers, wherein determining the optimal allocation comprises:

determine different combinations of the plurality of containers that occupy the plurality of slots of the item cache;

determine a number of orders from the set of orders that are fulfilled based on items contained in each combination of the plurality of containers; and select the set of containers for the optimal allocation of the plurality of slots in response to the set of containers containing items for fulfilling a greater number of orders than items contained in other combinations of the plurality of containers.

15. The autonomous order fulfillment system of claim 12, wherein selecting to eject one of the first container and the second container comprises:

detecting a second subset of orders from the set of orders that remain unfulfilled;

determining a fewest number of container replacements from the plurality of slots for populating the plurality of slots with containers containing items for fulfilling the second subset of orders; and selecting the second container for removal from the plurality of slots while retaining the first container in response to the second container being part of the fewest number of container replacements.

16. The autonomous order fulfillment system of claim 12, wherein reserving one of the plurality of slot types comprises:

selecting a set of the plurality of slots as candidates for temporary storage of the particular container at the item cache without designating a specific slot from the set of slots for the particular container.

17. The autonomous order fulfillment system of claim 16, wherein selecting to eject one of the first container and the second container comprises:

selecting the specific slot for the particular container once the particular container is transferred to the item cache and based on a fulfillment state of the subset of orders.

18. The autonomous order fulfillment system of claim 12, wherein selecting to eject one of the first container and the second container comprises:

delaying a selection of a slot for the particular container until the particular container is transferred to the item cache; and selecting the slot for the particular container based on items for the subset of orders that have been retrieved from the set of containers in the plurality of slots.

* * * * *